United States Patent [19]

Scott-Jackson et al.

[11] 4,353,705

[45] Oct. 12, 1982

[54] SPROCKET AND CLUTCH DRUM ASSEMBLY

[75] Inventors: Dennis G. Scott-Jackson; Hui C. Lim, both of Burnaby, Canada

[73] Assignee: Windsor Machine Company Limited, Burnaby, Canada

[21] Appl. No.: 112,801

[22] Filed: Jan. 16, 1980

[30] Foreign Application Priority Data

Nov. 14, 1979 [CA] Canada .................................. 339815

[51] Int. Cl.³ ........................................... F16H 55/12
[52] U.S. Cl. ................................. 474/158; 29/159.2; 29/159.3; 403/272; 403/359; 474/902
[58] Field of Search .............. 474/152, 158, 164, 902; 29/159 R, 159.2; 228/138, 182; 403/272, 365, 359; 30/383, 384, 385

[56] References Cited

U.S. PATENT DOCUMENTS

| | | | |
|---|---|---|---|
| 1,656,697 | 1/1928 | Dickey | 403/272 X |
| 2,932,207 | 4/1960 | Whitney | 403/359 |
| 3,045,502 | 7/1962 | Carlton | 474/158 |
| 3,099,924 | 8/1963 | Armstrong | 474/158 |
| 3,144,782 | 8/1964 | Edmunson | 474/158 |
| 3,144,890 | 8/1964 | Irgens | 474/158 X |
| 3,279,272 | 10/1966 | Gudmundsen | 474/164 |
| 3,519,037 | 7/1970 | Linkfield | 474/158 X |
| 3,541,871 | 11/1970 | Burrell | 403/359 X |
| 3,849,884 | 11/1974 | Arff | 474/158 X |
| 3,868,863 | 3/1975 | Gasner | 474/152 X |
| 3,999,924 | 12/1976 | Tanaka . | |

Primary Examiner—C. J. Husar
Assistant Examiner—Conrad L. Berman
Attorney, Agent, or Firm—Chernoff & Vilhauer

[57] ABSTRACT

An improved drive assembly for a powered chain saw or the like, which drive assembly includes a drive sprocket having a hub portion centrally and presenting a hub extension at one end for coaxially registering within the centered opening of the end wall of a clutch drum, and an axially extending apertured reinforcing washer disposed between the teeth of the sprocket wheel and surrounding the tips thereof in the region of abutment of the drive sprocket and clutch drum so as to register within the recesses of the sprocket teeth and present an extended joining area therebetween for securing same against separation.

5 Claims, 2 Drawing Figures

U.S. Patent    Oct. 12, 1982    4,353,705
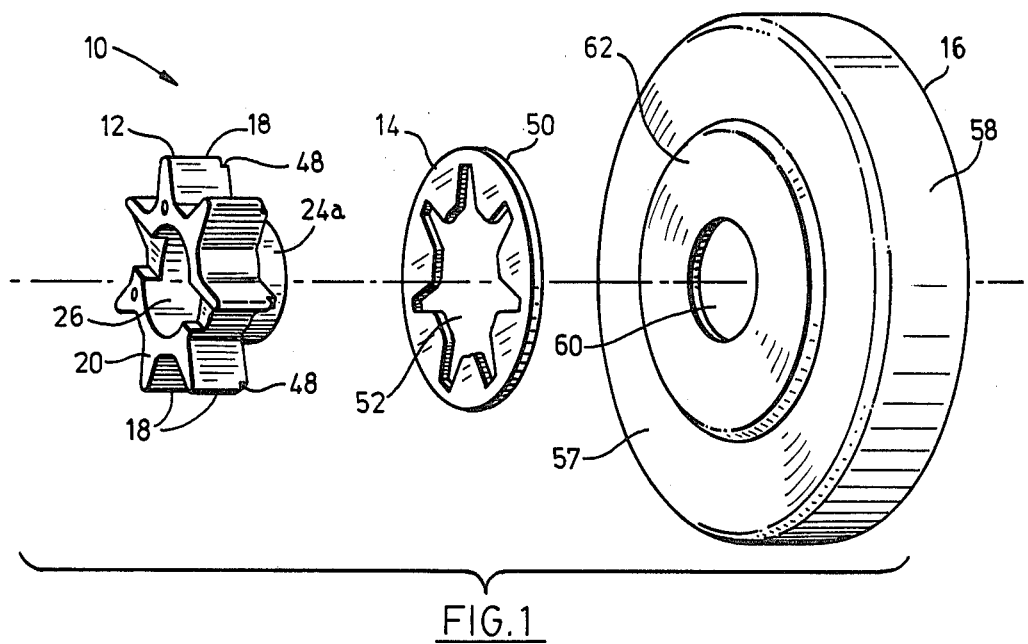
FIG.1
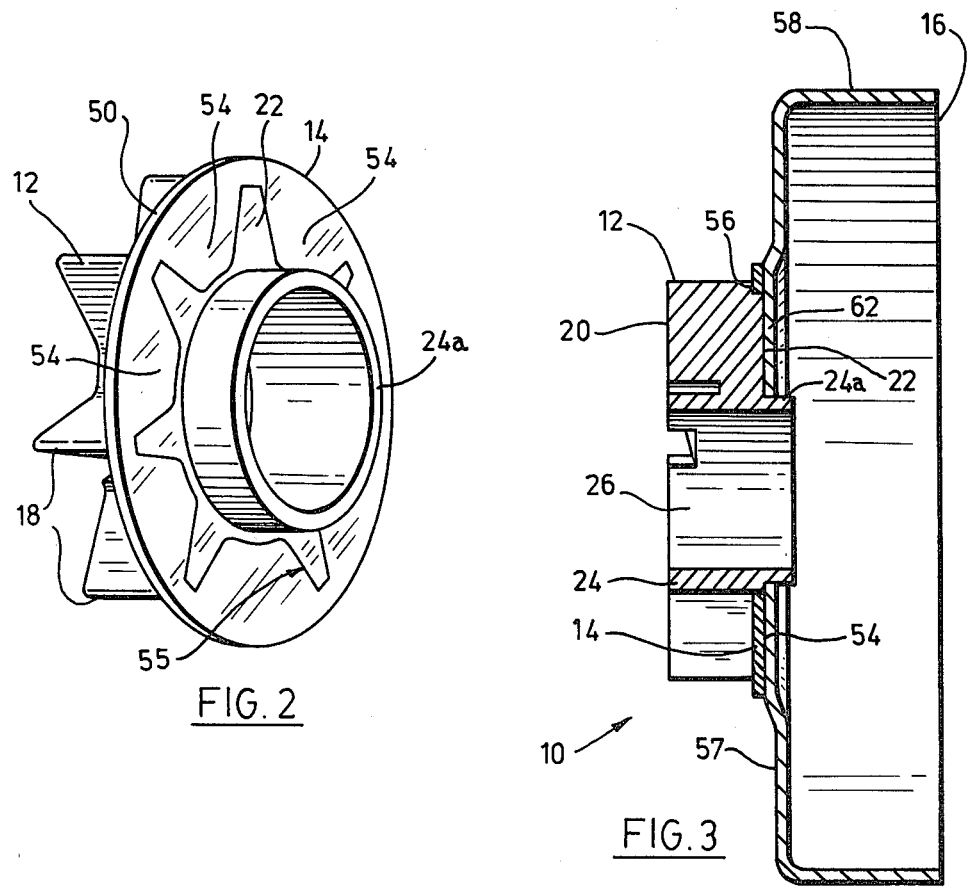
FIG.2
FIG.3

SPROCKET AND CLUTCH DRUM ASSEMBLY

NATURE OF THE INVENTION

This invention relates to improvements in chain saws and more particularly, to improvements in assemblages for transmitting power from the driven shaft of the chain saw motor to the saw chain and is especially directed to enhancing the joint between the toothed dime sprocket and associated clutch drum in such assembly.

BACKGROUND OF THE INVENTION

Power chain saws of the type under consideration include the requisite support frame for the motor and a cutter or saw bar, which bar carries an endless loop of selected saw chain mounted for displacement by means of a drive sprocket, whose configuration and pitch and appropriately correlated with the configuration and pitch of the saw chain linkages.

The aforementioned sprocket is adapted to displace the drive links of the saw chain loop which are urged into registration with the sprocket teeth as the saw chain passes around the drive sprocket having emerged from one reach of the saw bar track or channel and returning to the other reach in its endless path of travel.

The toothed sprocket component is part of an overall drive assembly that includes a centrifugal clutch mechanism which employs a clutch drum component fixedly secured to the sprocket in adjacent or abutting relation thereto and in axial alignment therewith. Both components are rotatably supported as a unit in such a manner that the output shaft of the saw chain motor can selectively engage same to rotate associated clutch drum and drive sprocket and hence impart displacement to the saw chain in its endless path of travel.

The approaches adopted by original equipment manufacturers and parts suppliers in this field include an arrangement wherein the toothed drive sprocket is fixedly secured in abutting relation to the principal wall of the clutch drum component by a brazing operation or its equivalent.

The radiating teeth of the sprocket have a substantial axial extent to accommodate lateral shifting of the saw chain during chain saw operation with the sprocket presenting an extended hub portion axially beyond the sprocket teeth to one side to register within a central aperture defined within the principal clutch drum wall whereby the clutch drum can be adequately supported in abutting relation to the end walls or surfaces of radiating teeth of the sprocket and securely anchored against axial separation.

The several end surfaces of the radiating teeth of the sprocket are separated by their intervening recesses which are open-ended. Those end surfaces of the sprocket teeth are flat and are in a common plane such that they can be drawn into abutment with the flat surface of the principal clutch drum wall and upon undergoing and appropriate brazing operation or its equivalent be secured against separation by joining over such abutment area.

Such joining provided by the brazing operation between the sprocket and clutch drum is susceptible to failure in certain circumstances. When larger torsional forces are localized at the interface between the several abutting end surfaces of the sprocket teeth and clutch drum surface as rotary motion is imparted by the sprocket teeth to the saw chain loop the joint is under substantial stress. When such forces are excessive or extreme, having regard to the relatively small area of such brazed joint, joint fatigue may occur and failure follow with the sprocket spinning off at the clutch drum surface.

Moreover, not only are twisting and shearing forces experienced during normal operations but extreme intermittent loading may occur when the saw chain is caught in the kerf stalling the chain momentarily.

Frictional forces at the face of the clutch cup and clutch shoes at the time of slippage generate substantial heat which promotes reducing resistance to fatigue contributing to ultimate failure. Further, shifting of the saw chain during chain saw operation across the surfaces of contact of respective teeth of the sprocket generate both heat and variable loading which works against the preservation of the continued unity of such a composite unit.

It has also been found, as expected, that the incidence of fatigue and joint failure of such drive assembly is much greater in larger powered chain saws because of the increased loads and likelihood of generating forces well exceeding the fatigue and failure limits.

Failure of such drive assembly in the field causes immediate shutdown of the chain saw. A replacement must be obtained which requires an inventory of such units to be maintained or the chain saw remains shut down. Lost production through shutdown inflicts a loss giving rise to the need for an improved joint for such drive assembly with sustained operating characteristics over a greater range.

This need is illustrated by referring to prior publications outlining proposals of alternatives recommended to overcome the obstacles inherent in such drive assembly arrangements.

U.S. Pat. No. 3,099,924 reveals a sprocket and drum assembly releaseably secured together so that a damaged drive sprocket may be readily replaced when required and without discarding the clutch drum component.

U.S. Pat. No. 3,144,890 discloses a sprocket wheel and associated clutch drum assembly which provides for limited axial displacement therebetween thus permitting the sprocket to accommodate shifting or side sway of saw chain as it progresses around the sprocket.

Still another alternative is described in U.S. Pat. No. 3,279,272 in which a single-piece sprocket may be brazed or otherwise secured to the clutch drum for support upon a stationary shaft and provided with suitable bearings for selective engagement with the powered output of the chain saw motor.

Other arrangements disclose frictional spring washers to accomplish engagement of the clutch drum with the sprocket wheel as outlined by U.S. Pat. No. 3,849,884 whereas in still other proposals include a slidable interconnection between sprocket wheel and clutch drum as illustrated by U.S. Pat. No. 3,519,037; or where the faces of the sprocket teeth have been pressed into the clutch drum wall by an upsetting operation as disclosed by Canadian patent No. 766,555.

OBJECTS OF THE INVENTION

It is an object of this invention to provide an improved drive assembly for a chain saw of substantially increased strength and performance as compared with those arrangements earlier disclosed or used and particularly to provide improved joining between the drive sprocket component and the clutch drum component whereby joint fatigue is substantially avoided over a wider range of applied loads minimizing likelihood of failure and shutdown of chain saw operation.

It is also an object of this invention to increase the strength of the joint for attachment without appreciably altering the structures of the essential components of conventional equipment.

It is still a further object of this invention not only to increase the strength of the joint as outlined but to provide a novel approach to the fabricating of same which leads to streamlining of processing and to greater efficiency in overall production of the unit.

FEATURES OF THE INVENTION

It is a feature of this invention to optimize the brazing process and attachment potential of locking the drive sprocket into position on the clutch drum by the interposing between the abutting sprocket and clutch drum a washer-like component suitably apertured centrally and of a perimetral configuration such that it substantially matches the perimetral outline of the end wall or end surfaces of the drive sprocket teeth. Thus, with the washer-like component oriented in the axial disposition with respect to the sprocket axis, the washer-like component registers within the tooth recesses to bridge the separations therebetween and when presented in the adjacent relation to the end surfaces of the teeth to be joined to the clutch drum materially extends the useful join area for brazing attachment.

More particularly, the washer-like component, according to the preferred embodiment, has a circular perimeter centered on its axis having a radius greater than the radial extent of the sprocket teeth, the tips of the sprocket teeth adjacent to the end surfaces to be joined to the clutch drum being suitably recessed axially a sufficient extent so as to accommodate the thickness of the washer-like component and radially a sufficient extent so as to define a ledge or shoulder formation for releaseably locking the washer-like component end sprocket against separation as will be explained.

In this embodiment the contour of the central aperture of the washer-like element is modified in those regions matching the teeth tip portions so that they register with the ledge or shoulder formations whereby substantial mating interlocking relation is achieved, the respective surfaces of the end walls of the teeth and those portions of the washer-like component bridging the separations therebetween automatically lining up to present a substantially uninterrupted planar annular surface for attachment to the corresponding uninterrupted surface of the clutch drum.

Thus, it will be understood that through such proposal the brazing or joining area presented to the clutch drum surface by the composite sprocket and associated interlocked washer-like component greatly exceeds the area presented by the separated end walls of the sprocket teeth themselves thereby ensuring a joint of greater extent and hence of greater strength and resistance to spin off failure.

Moreover, by providing an arrangement wherein the tooth recesses are fully penetrated and bridged by the contoured projections of the aperture of the washer-like component an abutting relationship between the edge of the aperture and the walls of the tooth recesses is established so as to extend the joint area axially of the components and at right angles to the major interface or jointing area between the clutch drum and sprocket which joint further increases the loading capability and resistance to torsional shearing forces.

The composite article is additionally reinforced by the strength of the material of the washer-like component itself and by arranging for the interlock of same with the sprocket as outlined.

By providing an arrangement wherein captivation of the sprocket by the apertured reinforcing washer or vice versa is ensured, manipulation of the several components to bring same into aligned registration is materially reduced aiding in automating the progression of the several steps inherent in commercial production or fabrication of such article.

These and other objects and features will become apparent in the following description to be read in conjunction with the sheet of drawings in which:

FIG. 1 is an exploded perspective view of the components of a drive assembly embodying the invention revealing particularly the configurations and relationships between the toothed sprocket, the apertured reinforcing washer and associated clutch drum component;

FIG. 2 is an enlarged perspective view illustrating the interlocking mating relation of the preferred embodiment of toothed sprocket and apertured reinforcing washer of FIG. 1; and p FIG. 3 is a vertical cross-sectional view of the assembled components of FIG. 1 arranged in aligned operative registration.

The drive assembly indicated at 10 in FIGS. 1 and 3 includes a toothed sprocket wheel 12 complementary apertured reinforcing washer or element 14 and associated clutch drum component 16.

Sprocket 12 includes radiating outwardly projecting sprocket teeth 18 of like configuration and extent and of angular separation to match the pitch of selected saw chain (not illustrated) which is adapted to be driven by such sprocket during chain saw operation.

Sprocket 12 has a substantial axial extent to accommodate shifting saw chain during chain saw operation, with the several teeth 18 bounded outwardly by end walls 20 and inwardly by end walls 22 respectively and includes a centrally located hub formation 24 presenting an axial bore or bearing 26 by means of which the sprocket 12 can be journalled or supported upon a suitable shaft (not illustrated).

Each of the apices of sprocket teeth 18 of the inner end walls 22 are provided with a stepped notch 48 of like axial and radial extent to present a ledge or shoulder formation for locating and securing the apertured reinforcing washer 14 in the disposition illustrated by FIG. 2 of the drawings.

Apertured reinforcing washer 14 is derived from suitable steel plate by means of a stamping operation with appropriate dies to present a circular perimeter outermost as at 50 and a central aperture 52 of a configuration patterned after the perimetral outline of the inner end walls 22 of sprocket teeth 18, depicted in perspective in FIG. 1 of the drawings and illustrated in full registration in FIG. 2 of the drawings.

By limiting the axial extent or depth of notches 48 to the thickness of the stamped reinforcing washer 14 upon registration of the reinforcing washer 14 with sprocket 12 revealed by FIG. 2 of the drawings, the surfaces of end walls 22 and surfaces of the regions 54 of washer 14 bridging the recesses therebetween line up in substantially coplanar relation outermost.

Moreover, where as in the preferred embodiment illustrated in FIGS. 1 to 3 inclusive of the drawings, the contour of central aperture 52 of washer 14 is selected so that it fully penetrates and bridges the tooth recesses, there is full perimetal abutment of reinforcing washer 14 with axially extending wall portions of the teeth 18 throughout its extent as indicated generally at 55 in FIG. 2 and peripheral abutments achieved as at 56 with respect to the tip portions of the sprocket teeth 18 and the peripheral portions of reinforcing washer 14 as best seen in FIG. 3. Such regions of abutment afford additional area for joining so as to increase or extend the overall strength of the composite article.

It will be understood if desired that the stepped notches 48 can be omitted and other alternatives adopted to limit axial displacement of apertured reinforcing washer 14 in relation to the sprocket teeth 18 so as to automatically establish the requisite substantial coplanarity of end walls 22 and regions 54 revealed by FIGS. 2 and 3 of the drawings respectively.

Sprocket 12 is provided with hub extension 24a beyond end walls 22 for presentation to associated clutch drum component 16. It is obvious that the internal configuration and dimensions of central aperture 52 of reinforcing washer 14 is such that in axial orientation with sprocket 12 it readily passes over hub extension 24a to register in mating relation with the sprocket teeth 18 as earlier outlined.

The specifications for the notching as at 48 of sprocket teeth 18 and the outline or configuration of aperture 52 of reinforcing washer 14 remote from its axis is preferably selected such that slight pressure is required to fully register one with the other to captivate same taking advantage of the spring-like character of the washer 14 derived from suitable steel sheeting or other stock. Hence in undertaking assembly of the composite article the captivated components reinforcing washer 14 and drive sprocket 12 can be treated as a single entity.

Clutch drum 16 has a conventional generally cup-shaped configuration including principal wall portion 57 and surrounding side wall portion 58, the principal wall portion 57 having a centrally axially aligned aperture as at 60 for the reception of hub extension 24a of sprocket 12 therewithin shown in FIG. 3 in the drawings.

Principal wall portion 57 of clutch drum 16 in the region surrounding aperture 60 is formed to present a raised annular abutment surface 62 to match in area the combined surfaces presented by end walls 22 of sprocket teeth 18 and the surfaces of the bridging regions 54 of reinforcing washer 14. The aforementioned opposed annular surfaces derived from the composite arrangement constitute the major joining interface which is extended in an axial direction by the earlier mentioned line of abutment 55 and peripherally located abutting regions 56.

When fully joined by a brazing operation or its equivalent the composite article before it would fail would require both sprocket 12 and reinforcing washer 14 to be spun off the annular surface 62 of clutch drum 16 resisted not only by the materially increased area of the major joint interface and associated axially extending joining areas presented by the line of juncture as at 55 and peripherally located abutting regions 56 but by the strength of materials presented by the interposed reinforcing washer 14 lodged between sprocket teeth 18.

Each of the components 12, 14 and 16 are intended to be derived from suitable steel bar, plate or stock in a conventional manner and are to be heat treated or otherwise processed to achieve established standards of strength, hardness and performance.

Moreover, the brazing operation or its equivalent intended to securely anchor the respective components in the relationship revealed by FIG. 3 of the drawings are conventional and for that reason have not been described in particularity.

It will be apparent to those persons skilled in this field that variations or modifications may be undertaken in the structures of the preferred embodiment described and illustrated herein or in the approach to assembly of same without departing from the spirit or scope of the invention as defined by the appended claims.

What I claim is:

1. In a drive assembly a centrally located hub formation having a longitudinally axis, an axially aligned toothed drive sprocket formation and associated clutch drum member mounted on said hub formation, said drive sprocket formation including like axially extending radially projecting teeth, said teeth each presenting at the end thereof adjacent to said clutch drum member substantially co-planar end wall surfaces at right angles to said axis, said clutch drum member including an outwardly radiating wall portion surrounding said hub formation and presenting an uninterrupted substantially planar surface to said co-planar end wall surfaces of said sprocket teeth, an axially extending reinforcing element carried by said toothed drive sprocket formation in the region of said co-planar end wall surfaces thereof, said reinforcing element including an outer marginal portion extending radially beyond and surrounding said sprocket teeth and integral portions projecting radially inwardly into the recesses between said sprocket teeth and in close proximity to the surfaces thereof so as to substantially bridge the separation therebetween, said outer marginal portion and integral inwardly projecting portions likewise presenting substantially co-planar surfaces to said uninterrupted surface of said clutch drum member and in substantial alignment with said co-planar end wall surfaces of said sprocket teeth, and joining means extending between and joining the adjacent and co-planar and uninterrupted surfaces respectively of said reinforcing element, clutch drum member and drive sprocket formation.

2. A drive assembly according to claim 1 in which the perimetral configuration of the integral portions of said reinforcing element projecting radially inwardly of said outer marginal portions substantially matches the perimetral configuration of said co-planar end wall surfaces of said sprocket teeth.

3. A drive assembly according to claim 1 or 2 in which at least some of the sprocket teeth are provided with recess means opening to their respective co-planar end wall surfaces, and said reinforcing element includes integral interengaging portions extending inwardly of said marginal portion and into and registering with said recess means, the selected axial extent of said recess means being such that with said interengaging portions of said reinforcing element in full registration therewith, said co-planar surfaces of said reinforcing element and sprocket teeth respectively are dispersed in substantial alignment.

4. A drive assembly according to claim 3 in which each of said sprocket teeth is provided with recess means, with said recess means extending radially outwardly to the extremities of said respective sprocket teeth.

5. In a drive assembly for a chain saw or the like including a centrally located hub formation having a longitudinal axis, an axially aligned toothed drive sprocket formation and associated clutch drum member mounted on said hub formation, said drive sprocket formation including like axially extending radially projecting teeth, said teeth presenting at one end thereof and at right angles to said axis substantially co-planar end wall surfaces, said clutch drum member including an axially offset and outwardly radiating annular wall portion surrounding said hub formation, said outwardly radiating annular wall portion presenting an uninterrupted surface to said co-planar end wall surfaces of said sprocket teeth, an axially extending reinforcing element carried by said toothed drive sprocket formation, said reinforcing element including an outer marginal portion extending radially beyond and surrounding said sprocket teeth in the region of said co-planar end wall surfaces and integral portions projecting radially inwardly into the recesses between said sprocket teeth and in close proximity to the surfaces thereof so as to substantially bridge the separation therebetween, each of said sprocket teeth being provided with a recess at the tooth extremities thereof including a radially extending wall portion terminating inwardly of said tooth extremity in an axially extending shoulder formation to their respective co-planar end wall surfaces, said reinforcing element including integral interlocking portions extending inwardly from said outer marginal portion and into and registring with said recess means, said marginal portion and integral inwardly projecting portions of said registered reinforcing element likewise presenting substantially co-planar surfaces to said uninterrupted surface of said clutch drum member and in substantial alignment with said co-planar end wall surfaces of said sprocket teeth, and joining means extending between and joining the adjacent and co-planar and uninterrupted surfaces respectively of said reinforcing element clutch drum member and drive sprocket formation.

\* \* \* \* \*

UNITED STATES PATENT AND TRADEMARK OFFICE
CERTIFICATE OF CORRECTION

PATENT NO. : 4,353,705
DATED : October 12, 1982
INVENTOR(S) : Dennis G. Scott-Jackson and Hui C. Lim It is certified that error appears in the above-identified patent and that said Letters Patent are hereby corrected as shown below:

| | | |
|---|---|---|
| Col. 3, | line 27 | After "the" insert the word --next--. |
| Col. 3, | line 66 | Change "joint" to --joining--. |
| Col. 3, | line 68 | Change "jointing" to --joining--. |
| Col. 4, | line 1 | Change "joint" to --joining--. |
| Col. 4, | line 25 | Delete "p" and start new paragraph. |
| Col. 6, | line 16 | Change "longitudinally" to --longitudinal--. |

Signed and Sealed this

Fifteenth Day of February 1983

[SEAL]

Attest:

GERALD J. MOSSINGHOFF

Attesting Officer

Commissioner of Patents and Trademarks